(12) United States Patent
Chuang et al.

(10) Patent No.: US 11,258,263 B1
(45) Date of Patent: Feb. 22, 2022

(54) APPARATUS OF POWER-GENERATING SOLID OXIDE FUEL CELLS TIED TO GRID

(71) Applicant: Institute of Nuclear Energy Research, Atomic Energy Council, Executive Yuan, R.O.C., Taoyuan (TW)

(72) Inventors: Fang-Tzu Chuang, Taoyuan (TW); Chen-Min Chan, Taoyuan (TW); Ruey-Yi Lee, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 0 days.

(21) Appl. No.: 17/190,562

(22) Filed: Mar. 3, 2021

(30) Foreign Application Priority Data

Aug. 5, 2020 (TW) ................................. 109126566

(51) Int. Cl.
| | | |
|---|---|---|
| *H02J 3/38* | (2006.01) | |
| *H02J 3/32* | (2006.01) | |
| *H01M 8/24* | (2016.01) | |
| *H01M 8/04828* | (2016.01) | |
| *H02J 3/00* | (2006.01) | |

(52) U.S. Cl.
CPC ........... *H02J 3/381* (2013.01); *H01M 8/0494* (2013.01); *H01M 8/24* (2013.01); *H02J 3/008* (2013.01); *H02J 3/32* (2013.01); *H02J 3/388* (2020.01); *H02J 2300/30* (2020.01); *H02J 2310/12* (2020.01)

(58) Field of Classification Search
CPC .... H02J 3/381; H02J 3/008; H02J 3/32; H02J 3/388; H02J 2300/30; H02J 2310/12; H01M 8/0494; H01M 8/24
See application file for complete search history.

(56) References Cited

U.S. PATENT DOCUMENTS

| | | | | |
|---|---|---|---|---|
| 2014/0159491 | A1* | 6/2014 | Kusunose | ............... H02J 3/381 307/52 |
| 2014/0288724 | A1* | 9/2014 | Noguchi | ........... H01M 8/04925 700/297 |
| 2020/0036226 | A1* | 1/2020 | Nakamura | ............. G05B 15/02 |

* cited by examiner

*Primary Examiner* — Daniel Cavallari
(74) *Attorney, Agent, or Firm* — Demian K. Jackson; Jackson IPG PLLC

(57) ABSTRACT

An apparatus of solid oxide fuel cells (SOFC) is provided. The SOFCs generate power and are grid-tied. The apparatus comprises a power-generating side; and a grid-connecting side using an elementary household power management. The apparatus solves problems like low voltage, high current, voltage oscillation, voltage dips, long generator-starting time, etc. The apparatus is not only used as a stable power supply (base load), but also helps adjust the regional peak electricity demands. The features include the following: 1. A grid is tied, where output power does not pass through a direct-current boost converter and, thus, has no loss from it. 2. Injures, including voltage oscillation and sudden unloading after dumping, are reduced for avoiding further damages to cell sheets. 3. With the coordination of elementary power management and the integration of grid, the limitation of long-awaiting generator-starting time is crossed out and convenience of immediate power use is achieved.

5 Claims, 3 Drawing Sheets

APPARATUS OF POWER-GENERATING SOLID OXIDE FUEL CELLS TIED TO GRID

TECHNICAL FIELD OF THE INVENTION

The present invention relates to grid-tied solid oxide fuel cells (SOFCs); more particularly, to building a more-than-kilowatt (kW-plus) SOFC unit for generating power with its performance tested to be tied to a grid, where a high-efficiency SOFC decentralized power system is thus built by using an autonomous technology.

DESCRIPTION OF THE RELATED ARTS

In 2016, Taiwan moved towards the goal of a nuclear-free homeland for 2025, while the international carbon reduction commitment is taken into account through promoting energy transition. The targets for 2025 include: (1) green-extending: by accounting 20 percent (%) of renewable energy power generation; (2) gas-increasing: by accounting 50% of natural gas power generation; (3) coal-reducing: by decommissioning coal-fired units while building new gas-fired units; and (4) nuclear-free: by practically reviewing the postponement of nuclear energy or the resumption of nuclear power.

With the cooperation of government policy, implementations include distributed green energy power generation, energy storage, and smart grid. Because renewable energy (solar energy, wind energy, etc.) is unstable in power supply and not easy in power dispatch, there are many technologies that need to be overcome for grid-tying. Nevertheless, if a high-efficiency clean-energy conversion device of natural-gas SOFC is used, it can be considered not only to be used as a stable power supply (base load) but also to help adjusting regional peak electricity demands.

However, SOFC has a long start-up time. Although having a long run (more than a thousand hours), SOFC is still difficult to meet the random needs of household electricity. Therefore, the main features of a fuel cell power generator are as follows:

1. Independent power generation applications are used mostly, which mainly include 1~5 kilowatts power conversion components and used as an uninterruptible power system, an emergency power generation device for communication, or a portable power generation equipment.

2. Fuel cell has features of low voltage and low dynamic response. The system is usually used with a backup battery, while the other main components include a boost converter and a direct-current (DC)/alternative-current (AC) inverter.

3. The system is usually a multi-level conversion architecture, whose topics discussed extensively in literature include low efficiency, control complexity, high cost, etc.

Consequently, SOFC has problems with low voltage, high current, voltage oscillation, sudden drop, long generator-starting time, etc. Hence, the prior arts do not fulfill all users' requests on actual use.

SUMMARY OF THE INVENTION

The main purpose of the present invention is to build a kW-plus SOFC unit tied to a grid for generating power, where a high-efficiency SOFC decentralized power system is built by using an autonomous technology to obtain features comprising: (1) enhanced power-conversion: where mains applications can be connected without losing the output power as passing through a DC boost converter; (2) increased supply stability: where the chance of damage to battery slice owing to sudden unloading out of voltage oscillation and dips is reduced; and (3) improved use convenience: where, with the coordination of an elementary power management, the limitation of long-waiting generator-starting time is crossed out and convenience of using power at any time is achieved.

To achieve the above purpose, the present invention is an apparatus of power-generating SOFCs tied to a grid, comprising a power-generating side and a grid-connecting side, where the power-generating side comprises a more-than-kilowatt (kW-plus) power-generating SOFC unit, a DC bus controller connecting to the kW-plus power-generating SOFC unit, and a DC electronic load (E-load); the grid-connecting side comprises a power protection unit connecting to the DC bus controller, a low-voltage DC/AC inverter connecting to the power protection unit, an elementary home energy management system (HEMS) connecting to the low-voltage DC/AC inverter to process controls and displays, an AC bus connecting to the elementary HEMS, a distribution box connecting to the AC bus and mains, an auxiliary power connecting to the low-voltage DC/AC inverter and the AC bus, an independent power connecting to the low-voltage DC/AC inverter, and a load side connecting to the AC bus; the grid-connecting side has an independent interface to process controls and displays through the elementary HEMS to avoid mutual interference with the kW-plus power-generating SOFC unit and provide secret communication; through the power protection unit, the grid-connecting side has the elementary HEMS provide protections on reverse current, short circuit, and overload, protections on overvoltage and undervoltage, and protections on overfrequency and underfrequency; the auxiliary power helps to avoid sudden unloading out of voltage oscillation; the grid-connecting side has the elementary HEMS gradually load a generated power through the low-voltage DC/AC inverter; through the elementary HEMS, the AC bus, and the distribution box, the kW-plus power-generating SOFC unit generates power ready to be used immediately; insufficient watt of the load side is supplemented by tying to a grid; the part of the generated power exceeding required use amount is outputted to the grid; and, on power outage of the grid, the independent power (islanding) gradually loads the generated power while the load emergently and critically processes an adjustment of not greater than 1 ampere per minute or an adjustment of not greater than 10 W per minute with the use of the kW-plus power-generating SOFC unit. Accordingly, a novel apparatus of power-generating SOFCs tied to a grid is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
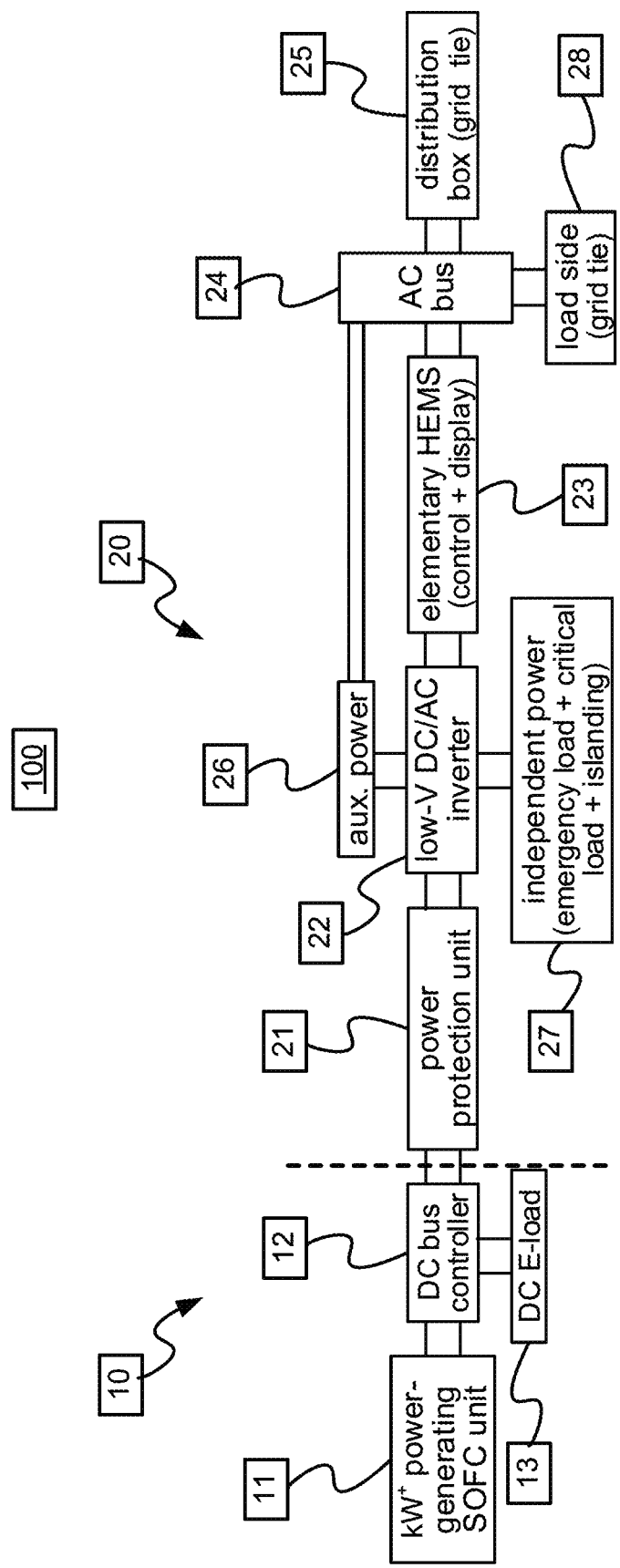
FIG. 1 is the structural view showing the preferred embodiment according to the present invention.
Figure 2:
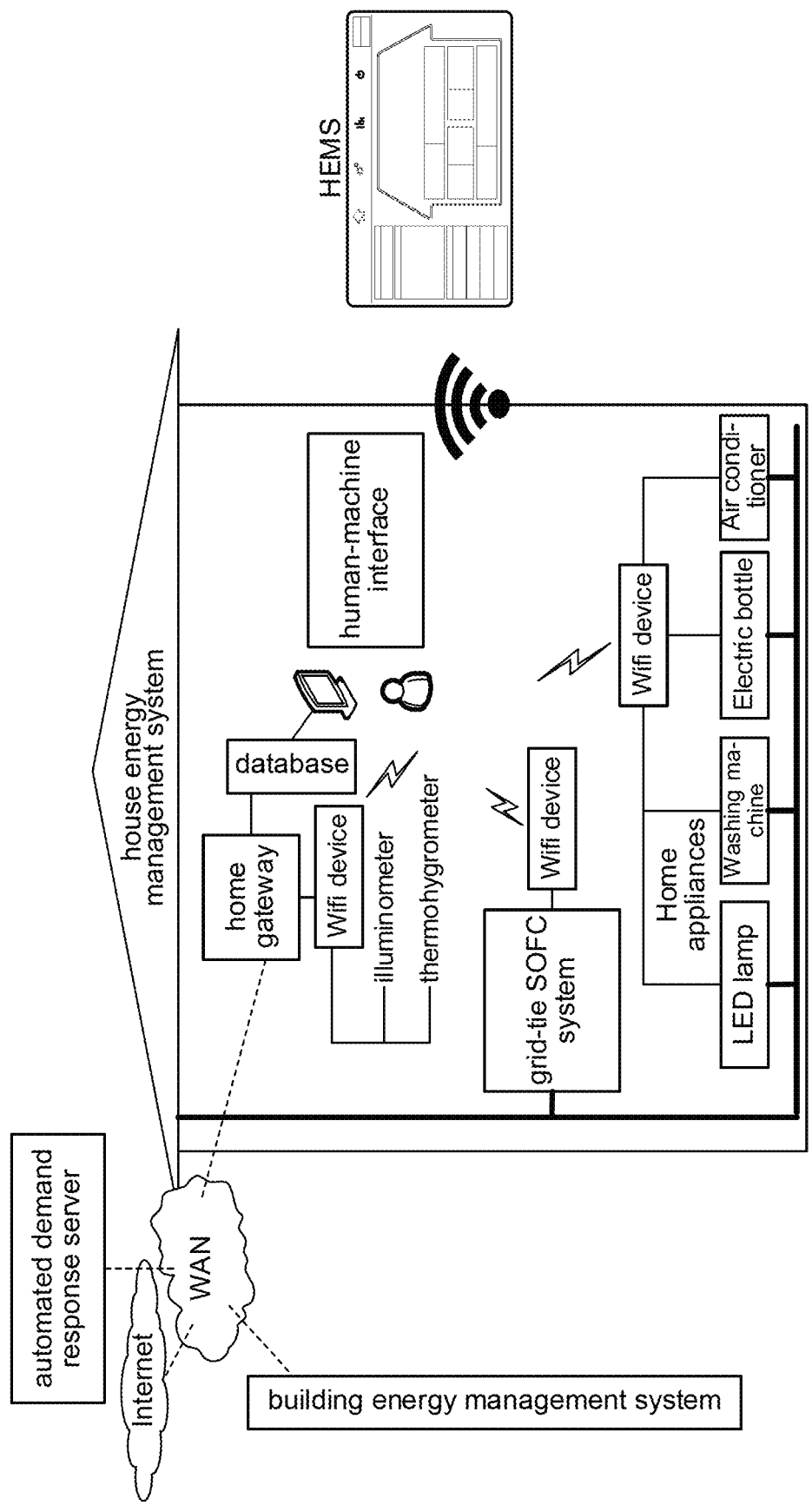
FIG. 2 is the view showing the elementary home energy management system (HEMS) tying to the grid.
Figure 3:
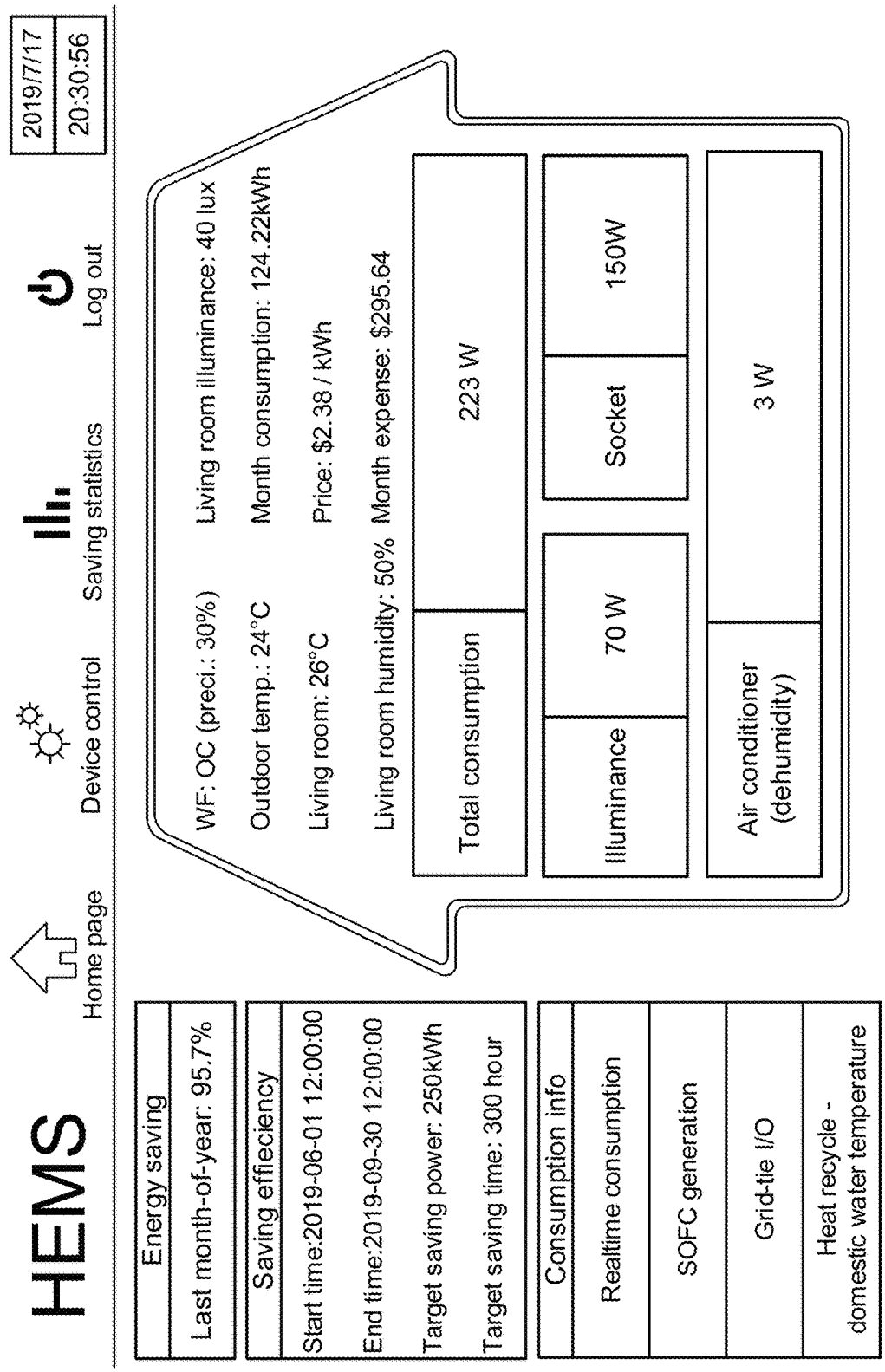
FIG. 3 is the view showing the enlarged area of FIG. 2.

Please refer to FIG. 1 to FIG. 3, which are a structural view showing a preferred embodiment according to the present invention; a view showing an elementary HEMS tying to a grid; and a view showing an enlarged area of FIG. 2. As shown in the figures, the present invention is an apparatus of power-generating solid oxide fuel cells (SOFC) tied to a grid 100, comprising a power-generating side 10 and a grid-connecting side 20.

The power-generating side 10 comprises a more-than-kilowatt (kW-plus) power-generating SOFC unit 11; a direct-current (DC) bus controller 12 connecting to the kW-plus power-generating SOFC unit 11; and a DC electronic load (E-load) 13 connecting to the DC bus controller 12.

The grid-connecting side 20 comprises a power protection unit 21 connecting to the DC bus controller 12; a low-voltage DC/AC (alternating current) inverter 22 connecting to the power protection unit 21; an elementary HEMS 23 connecting to the low-voltage DC/AC inverter 22 to process controls and displays; an AC bus 24 connecting to the elementary HEMS 23; a distribution box 25 connecting to the AC bus 24 and the grid; an auxiliary power 26 connecting to the low-voltage DC/AC inverter 22 and the AC bus 24; an independent power 27 connecting to the low-voltage DC/AC inverter 22; and a load side 28 connecting to the AC bus 24. Thus, a novel apparatus of power-generating SOFCs tied to a grid is obtained.

The grid-connecting side 20 has an independent interface to process controls and displays through the elementary HEMS 23 for avoiding mutual interference with the kW-plus power-generating SOFC unit 11 of the power-generating side 10 and providing secret communication. The present invention processes coordination assessment through information and communications technology (ICT) to determine power dispatching with power company. Hence, basic confidentiality for information security, trade secrets, personal data, etc. is required for avoiding law conflict and influences on the interests of company and personal.

Through the power protection unit 21, the grid-connecting side 20 provides protections on reverse current, short circuit, and overload, protections on overvoltage and undervoltage, and protections on overfrequency and underfrequency; and the auxiliary power 26 helps avoid sudden unloading out of voltage oscillation. The auxiliary power 26 is an AC/DC power supply or a battery module.

The grid-connecting side 20 gradually loads a generated power (watt, W) through the low-voltage DC/AC inverter 22. Through the elementary HEMS 23, the AC bus 24, and the distribution box 25, the kW-plus power-generating SOFC unit 11 generates power ready for use immediately. A grid is used to supplement insufficient watt for the load side 28. The part of the generated power exceeding the required amount of the use is outputted to the grid. The exceedingly generated power can be further sold to power company while the power of base load or regional peak electricity demands is adjusted.

The independent power 27 (islanding) gradually loads the generated power while the emergency load and critical load processes an adjustment of not greater than ($\leq$) 1 ampere per minute (/min) or $\leq$10 W/min to avoid cell damage (reduction of total power) owing to sudden lifting or dropping load.

The displays and controls of related devices are shown in FIG. 3, including device control, consumption info—realtime consumption, and power inputted and outputted (I/O) on tying to the grid, etc. In the end, coordination assessment is determined with ICT and power company for power dispatching.

The kW-plus power-generating SOFC unit 11 of the apparatus of SOFCs tied to the grid 100 is characterized in an open circuit voltage about not smaller than ($\geq$) 34 volts (V); and an output voltage and current of $\geq$25V and 40 amperes (A) under a full load$\geq$1 kW. The generated power of the kW-plus power-generating SOFC unit 11 is shown in the consumption info—realtime consumption as shown in FIG. 3. During generating and loading power, the kW-plus power-generating SOFC unit 11 adjusts the power ranges of a preload test of the DC bus controller 12 and a connection load of the low-voltage DC/AC inverter 22; and, after being preloaded to kW, the DC E-load 13 is gradually unloaded and the low-voltage DC/AC inverter 22 is simultaneously gradually loaded to $\geq$1 kW. After starting power generation until the full load is reached, the grid is connected to provide a voltage of 110V and 220V. In addition, thermal energy is recycled to be reused for heating domestic water.

Accordingly, the present invention uses the apparatus to solve SOFC problems, including low voltage, high current, voltage oscillation, voltage dropping, a long generator-starting time, etc., whose target is to develop a kW-plus SOFC system tied to the grid for considerations of not only being used as a stable power supply (base load) but also helping adjust regional peak electricity demands with the followings features obtained:

1. Enhanced power conversion: With a grid-tie inverter (19V-34V) suitable for the voltage (e.g. low voltage of 25V and high current of 40 A under 1 kW) of a SOFC power generation and a larger voltage range for corresponding wattage, the AC output is synchronized with frequency and phase of mains without the loss of the power on passing through a DC boost converter.

2. Increased supply stability: During SOFC power generation, the battery may become unstable owing to the hydrogen ($H_2$) generated from water ($H_2O$) and methane ($CH_4$) while voltage oscillation (with generated power ±50 W) or voltage dip may thus happen, i.e. half-cell reaction ($2H_2+O_2 \rightarrow 2H_2O$) at anode in SOFC. Therein, the main source of hydrogen comes from the hydrogen conversion reaction of methane ($CH_4+2H_2O \rightarrow CO+4H_2$). As a result, when water and methane generate hydrogen to enter into the battery and make the flow distribution become unstable owing to its system body or battery structure, voltage oscillation may happen in the half-cell reaction at anode. But, even when the working voltage dips to 18V, through installing auxiliary power (increase of more than 1V), the inverter (e.g. 19V~34V, along with bigger voltage range for corresponding volts) avoids the need of more than 300 seconds of waiting before reconnecting to a grid on unloading suddenly. Furthermore, the chance of damage to battery slice owing to the sudden unloading is reduced.

3. Improved use convenience: To meet the random need of household electricity, an elementary HEMS is connected to the grid as shown in FIG. 2 and FIG. 3. If the power is insufficient for home use, the grid makes up to meet the need. Therein, once the SOFCs are turned on for generating power, the power generated by the SOFCs is available at any time while extra power can be supplied to the grid through the connection (the extra power can be sold to a power company to adjust power of base load or regional peak electricity demands according to its power dispatching plan.)

To sum up, the present invention is an apparatus of power-generating SOFCs tied to a grid, where a kW-plus power-generating SOFC unit is built and its performance is tested; the unit is tied to a grid and test is processed to build a high-efficiency SOFC decentralized power system by using an autonomous technology; and the features comprises (1) enhanced power-conversion: that mains applications can be connected without losing the output power as passing through a DC boost converter; (2) increased supply stability: that the chance of damage to battery slice owing to sudden unloading out of voltage oscillation and dips is reduced; and (3) improved use convenience: that, with the coordination of an elementary HEMS, the limitation of long-awaiting generator-starting time is crossed out and the convenience of random power use is achieved.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An apparatus of power-generating solid oxide fuel cells (SOFCs) tied to a grid,
    comprising a power-generating side and a grid-connecting side,
    wherein said power-generating side comprises a more-than-kilowatt (kW-plus) power-generating SOFC unit, a direct-current (DC) bus controller connecting to said kW-plus power-generating SOFC unit, and a DC electronic load (E-load); said grid-connecting side comprises a power protection unit connecting to said DC bus controller, a low-voltage DC/AC inverter connecting to said power protection unit, an elementary home energy management system (HEMS) connecting to said low-voltage DC/AC inverter to process controls and displays, an alternating-current (AC) bus connecting to said elementary HEMS, a distribution box connecting to said AC bus and mains, an auxiliary power connecting to said low-voltage DC/AC inverter and said AC bus, an independent power connecting to said low-voltage DC/AC inverter, and a load side connecting to said AC bus; said grid-connecting side has an independent interface to process controls and displays through said elementary HEMS to avoid mutual interference with said kW-plus power-generating SOFC unit and provide secret communication; through said power protection unit, said grid-connecting side has said elementary HEMS provide protections on reverse current, short circuit, and overload, protections on overvoltage and undervoltage, and protections on overfrequency and underfrequency; said auxiliary power helps to avoid sudden unloading out of voltage oscillation; said grid-connecting side has said elementary HEMS gradually load a generated power through said low-voltage DC/AC inverter; through said elementary HEMS, said AC bus, and said distribution box, said kW-plus power-generating SOFC unit generates power ready to be used immediately; insufficient watt of said load side is supplemented by tying to a grid; the part of said generated power exceeding required use amount is outputted to said grid; and, on power outage of said grid, said independent power (islanding) gradually loads said generated power while said load emergently and critically processes an adjustment selected from a group consisting of an adjustment of not greater than 1 ampere per minute and an adjustment of not greater than 10 W per minute with the use of said kW-plus power-generating SOFC unit.

2. The apparatus according to claim 1,
    wherein said auxiliary power is selected from a group consisting of an AC/DC power supply and a battery module.

3. The apparatus according to claim 1,
    wherein, on outputting to said grid with coordination of dispatching of power company, said generated power is further sold to power company to adjust power selected from a group consisting of power of base load and regional peak electricity demands.

4. The apparatus according to claim 1,
    wherein, during generating and loading power, said kW-plus power-generating SOFC unit adjusts power ranges of a preload test of said DC bus controller and a connection load of said low-voltage DC/AC inverter; and, after being preloaded to not less than ($\geq$) 1 kilowatt (kW), said DC E-load is gradually unloaded and said low-voltage DC/AC inverter is simultaneously gradually loaded to $\geq 1$ kW.

5. The apparatus according to claim 4,
    wherein, after starting power generation until full load is reached, said kW-plus power-generating SOFC unit is grid-tied to provide a voltage selected from a group consisting of 110 volts (V) and 220V and recycles thermal energy to be reused.

* * * * *